US008533669B2

(12) United States Patent
King et al.

(10) Patent No.: US 8,533,669 B2
(45) Date of Patent: Sep. 10, 2013

(54) ANALYSIS OF DYNAMIC ELEMENTS IN BOUNDED TIME

(75) Inventors: Jefferson King, Bellevue, WA (US); Alan Oursland, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 12/426,972

(22) Filed: Apr. 21, 2009

(65) Prior Publication Data

US 2010/0269095 A1 Oct. 21, 2010

(51) Int. Cl.
*G06F 9/44* (2006.01)
(52) U.S. Cl.
USPC .......................................... 717/111; 717/140
(58) Field of Classification Search
None
See application file for complete search history.

(56) References Cited

U.S. PATENT DOCUMENTS

| | | | |
|---|---|---|---|
| 6,625,803 B1 | 9/2003 | Massena et al. | |
| 2008/0155511 A1* | 6/2008 | Cohen | 717/131 |
| 2008/0320438 A1 | 12/2008 | Funto et al. | |
| 2008/0320444 A1 | 12/2008 | Meijer et al. | |
| 2009/0100415 A1* | 4/2009 | Dor et al. | 717/131 |

OTHER PUBLICATIONS

"JScript IntelliSense Overview", retrieved at <<http://msdn.microsoft.com/en-us/library/bb385682.aspx>>, Jan. 14, 2009, pp. 6.
"VS 2008 JavaScript Intellisense", retrieved at <<http://winkey.tistory.com/15>>, Jun. 29, 2007, pp. 7.
"All New JavaScript Editor with Intellisense", retrieved at <<http://www.ajaxlines.com/ajax/stuff/article/all_new_javascript_editor_with_intellisense_.php>>, Jan. 14, 2009, pp. 16.
"Watch out for JScript Authoring Support in Visual Studio "Orcas"—Part I", retrieved at <<http://blogs.msdn.com/jscript/archive/2007/02/10/jscript-authoring-support-in-orcas.aspx>>, Jan. 14, 2009, pp. 3.
"JScript IntelliSense: A Reference for the "Reference" Tag", retrieved at <<http://blogs.msdn.com/webdevtools/archive/2007/11/06/jscript-intellisense-a-reference-for-the-reference-tag.aspx>>, Jan. 15, 2009, pp. 6.

* cited by examiner

*Primary Examiner* — Hyun Nam
(74) *Attorney, Agent, or Firm* — L. Alan Collins; Collins & Collins Intellectual, LLC (57) ABSTRACT

A code analysis system is described herein that provides code completion for programming languages that include elements that are not statically discoverable and that provides results in a predictable period that is acceptable for an interactive user interface. The system compiles each file into an intermediate state that can be stored and cached to speed later analysis of files. In addition, when executing a particular file, the system monitors a time-based threshold and/or a recursion depth so that if the compilation time is exceeding the threshold or a function is exceeding the recursion depth the system can stop the execution and use the intermediate results obtained up to that point to provide as much information as possible within a bounded execution time. When dynamic analysis fails, the system falls back to static analysis.

20 Claims, 4 Drawing Sheets

ANALYSIS OF DYNAMIC ELEMENTS IN BOUNDED TIME

BACKGROUND

Document editing tools often offer text completion features that allow an author to type a small amount of text, such as the beginning of a word, and insert a larger amount of text. For example, Microsoft Word includes AutoCorrect, which authors can use to store whole paragraphs of text that authors can insert by typing a single word or string of characters. For example, type the text "copyright" might insert a standard copyright disclaimer for a law office. Similarly, software development tools, such as Microsoft Visual Studio, provide the ability to view words that begin with typed letters as the developer types one or more letters. For example, Microsoft Visual Studio includes IntelliSense, which collects symbols by compiling an application program and enumerating a tree representation of the application program's source code. As the user types the first letters of a symbol, the user can press Tab or another key to insert the full text of the symbol.

Editor aides (such as code completion) generally rely on parsing to collect information about the schema of the code. This schema includes, but is not limited to global objects/methods, arguments for methods, type information, local variables, and their scope. Parsing (static analysis) is generally sufficient for collecting all of the schematic information needed from statically typed languages. Since statically typed languages generally do not allow modification of types (major component of the schema) at run-time, by parsing the static text of the code, one can reliably deduce what the final types will look like. For languages that are not statically typed, static analysis may not discover many code elements, so that they are unavailable for code completion. For example, consider the following code.

```
for( i=0; i< length; i++ )
{
    a["a" + i] = I;
}
```

The variables a.a0 and a.a1 are in the list at run time, but are not statically discoverable. As another example, the following is common in Asynchronous JavaScript and XML (AJAX) code. Executing the following code creates the class named "Foo," which is not statically discoverable.

```
CreateClass( "Foo" )
    this[ name ] = {...}
```

Execution of the code (dynamic analysis) can be performed to determine the complete picture of the schema of the code. For example, Microsoft Visual Studio 2008 performs static analysis on a current file and dynamic analysis on any included or referenced files. The dynamic results are then converted into data structures similar to the static results, a limited and error-prone process.

Analysis by execution has several problems. First, execution of large amounts of code, such as may be encountered in references to multiple code files, can be slower than an interactive user interface typically allows. For example, a single file may reference dozens of other files. Second, executed code may contain infinite loops, infinite recursion, or complex code that does not terminate or terminates in an unpredictable length of time. Code that is being edited is often in an intermediate state that is not stable or correct according to the author's ultimate purpose. This can lead to long execution times or even code paths that do not end. Third, scoping rules may cause sections of code to avoid execution and may limit results. For example, an analysis system may assume that an unknown variable has a particular value that leads to incomplete coverage of the code (e.g., because a branch is not followed when the variable has the chosen value).

SUMMARY

A code analysis system is described herein that provides code completion for programming languages that include elements that are not statically discoverable and that provides results in a predictable period that is acceptable for an interactive user interface. The system compiles each file into an intermediate state that can be stored and cached for later use. The intermediate results can be used from the current file repeatedly to execute the code in the referenced file as the current file changes. By caching the intermediate results, the system speeds later analysis of external files. In addition, when executing a particular file, the system monitors a time-based threshold and/or a recursion depth so that if the compilation time is exceeding the threshold or a function is exceeding the recursion depth the system can stop the execution and use the intermediate results obtained up to that point. This allows the system to provide as much information as possible within a bounded execution time. In some embodiments, when dynamic analysis fails, the system falls back to static analysis to discover as much information about the file as possible. Thus, the code analysis system provides a more complete set of elements for code completion in a way that performs well even for large sets of files.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A code analysis system is described herein that provides code completion for programming languages that include elements that are not statically discoverable and that provides results in a predictable period that is acceptable for an interactive user interface. The system compiles each file into an intermediate state that can be stored and cached for later use. For example, the system may compile each file in a project or each file related to a current file based on references in the current file to produce intermediate state data for each file.

This way, the system can use the intermediate results from the current file repeatedly to execute the code in the referenced file as the current file changes. By caching the intermediate results, the system speeds later analysis of external files. In addition, when executing a particular file, the system monitors a time-based threshold and/or a recursion depth so that if the compilation time is exceeding the threshold or a function is exceeding the recursion depth the system can stop the execution and use the intermediate results obtained up to that point. This allows the system to provide as much information as possible within a bounded execution time. In some embodiments, when dynamic analysis fails (e.g., because of a faulty function or due to reaching the time-based threshold), the system falls back to static analysis to discover as much information about the file as possible. Thus, the code analysis system provides a more complete set of elements for code completion than current systems, and does so in a way that performs well even for large sets of files.

Figure 1:
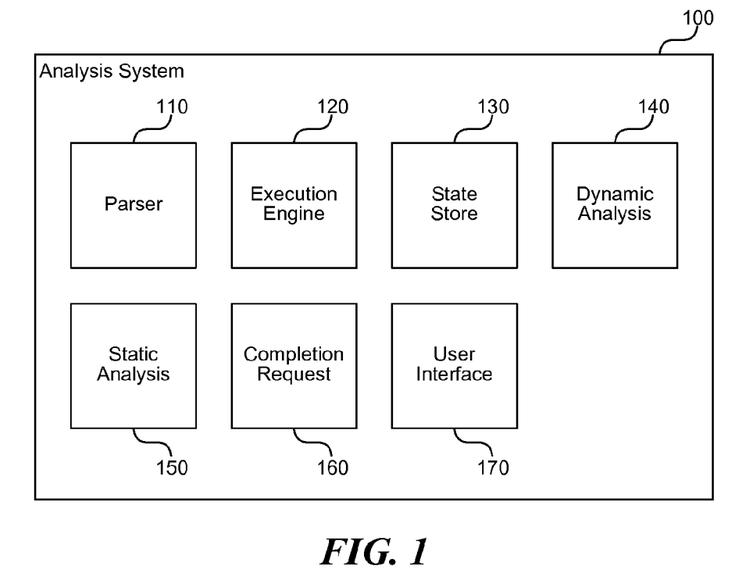
FIG. 1 is a block diagram that illustrates components of the code analysis system, in one embodiment.

FIG. 1 is a block diagram that illustrates components of the code analysis system, in one embodiment. The system 100 includes a parser component 110, an execution engine component 120, a state store component 130, a dynamic analysis component 140, a static analysis component 150, a completion request component 160, and a user interface component 170. Each of these components is described in further detail herein.

The parser component 110 compiles code from a file or other storage unit to produce executable code from source code. The system 100 may use the parser component 110 during static analysis to discover variable names, function names, and other source code data used for code completion. The system 100 may operate with various programming languages, and may include a parser component 110 for each programming language with which the system operates. The parser component 110 may provide an object model or other interface through which the system can discover symbols and other information resulting from compilation of a source file. The term compiling as used herein is intended generally to include any activities, such as interpretation, lexical analysis, and so forth performed on text-based source code to convert the code into another form, such as a tree, intermediate code, byte code, and so forth.

The execution engine 120 executes compiled source code to produce results in a development environment similar to execution of the source code in a production environment. The execution engine 120 also provides the ability to save the execution context or intermediate state of the execution engine at a particular point within a file or other source code storage unit. For example, the execution engine may store intermediate results for each file referenced by a particular file and at various points within the particular file. When a developer makes changes to the file, the system 100 can update a code completion list that contains possible symbols that a developer may want to reference by compiling and/or executing the current file at the point of editing and below. The system 100 may invoke the execution engine 120 with the intermediate state for each referenced file and for the current file down to the point of editing stored previously.

The state store 130 stores intermediate state information derived from compiling and executing source files. For example, the state store 130 may include a database, temporary file, in-memory data structure, or other storage location for persisting execution contexts and other intermediate state information for each file referenced in a project or included in a selected file that the developer is editing. For each execution context, the state store 130 contains snapshot information provided by the execution engine 120 that is sufficient to reload and invoke the execution engine 120 later to continue execution from the state of the execution engine 120 at a previous point in time.

The dynamic analysis component 140 discovers types, functions, and other code completion elements by executing source code. The dynamic analysis component 140 may discover elements that are not discoverable through static analysis of the source code. The dynamic analysis component 140 may separately execute multiple files provided by the developer or by a development environment. The dynamic analysis component 140 may also transfer state from analysis of one file to analysis of another file based on a relationship between the files. For example, if one file is a parent of another (e.g., by including the file), then information in the parent file may be relevant to processing of the related file. For example, if the parent file encloses the included file in a namespace declaration, then the system encloses variables discovered in the related file in the specified namespace. The level of dynamic analysis performed by the system 100 may vary based on configuration settings or the amount of time that has transpired analyzing a file. For example, the system may provide a rudimentary form of dynamic analysis that identifies more variables and other code elements than static analysis but does not exhaustively search the code. In addition, the system may provide deeper dynamic analysis that further executes the code, such as by performing more loop iterations, passing additional variables to functions, and so forth. When falling back from one level of analysis to another, the system 100 may initially try deep dynamic analysis, then step back to a lower level of dynamic analysis, and only in worst cases resort to static analysis, if at all.

The static analysis component 150 performs static analysis based on a compilation of one or more source files to discover variables, functions, and other code completion elements that are statically discoverable. Because static analysis may not discover some elements that are either created at runtime or otherwise obscured prior to execution of the source files, the system 100 may use the static analysis component 150 to provide a fallback level of code completion data when dynamic analysis is unavailable or fails for a particular source file. The system 100 may perform a mixture of dynamic analysis on some files or portions of files and static analysis on others based on the ability of the system to process each file in a timely manner and to produce the most complete results available for code completion.

The completion request component 160 receives notification when a developer is editing a file and invokes code completion. For example, the developer may type several characters and press the Tab or other key to indicate that the developer would like the development environment to provide a list of possible ways of completing the typed characters to produce a valid code reference. For example, if there is a variable named "myreallylongvariable," the developer may type "my" followed by Tab to see suggestions that begin with the typed characters. In some embodiments, the system may provide suggestions without the developer pressing any key at all. For example, after the developer types a certain number of characters (e.g., 3-4), the system may display a list of potentially matching code elements based on the typed characters. Then, the user may press a key, such as Tab, to commit the suggested code element into the text of the document or source file. When the system 100 receives a completion request through the completion request component 160, the system 100 may recompile and/or re-execute any files that have changed since the last request to update the code completion list with the latest code elements. The system 100 can complete this process quickly using the cached execution state stored in the state store 130.

The user interface component 170 displays the code completion list to the developer and receives input from the developer, such as to select a particular item from the code completion list. When the developer activates code completion, such as by typing characters followed by the Tab key, the system 100 detects that the developer is requesting code completion and invokes the receive completion request component 160. The system may display a list or other graphical control to the developer for selecting among several source code elements discovered during dynamic and/or static analysis of the source code to complete the characters already typed by the developer.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
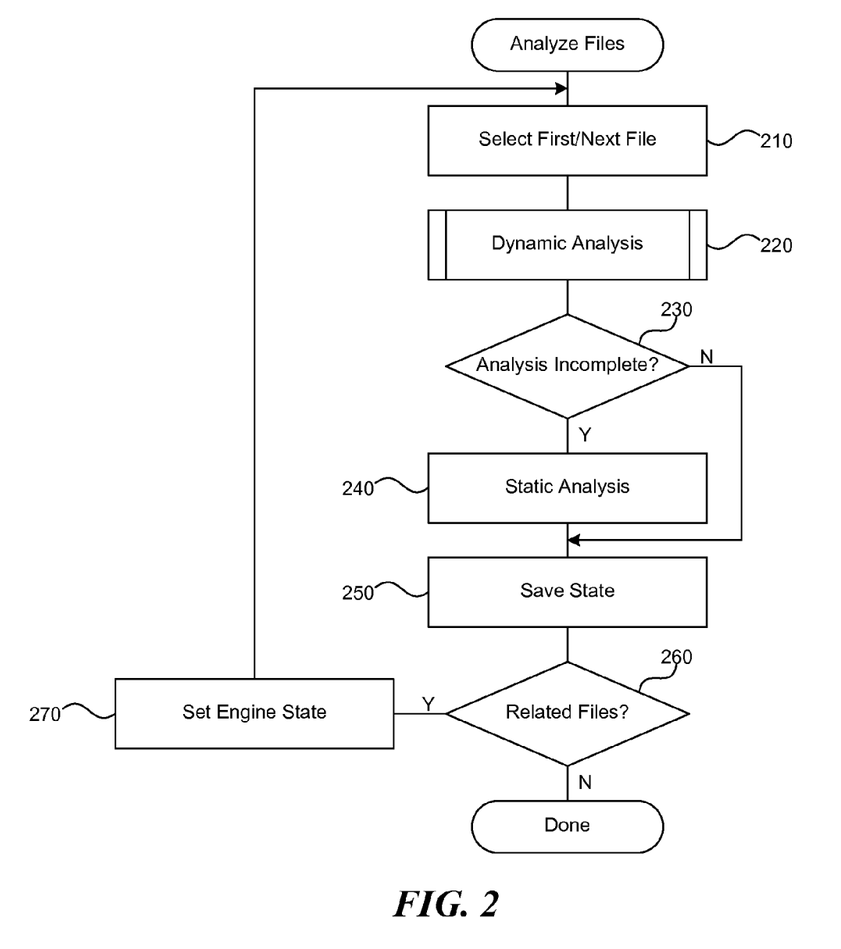
FIG. 2 is a flow diagram that illustrates the processing of the system to analyze related source code files for source code elements relevant to code completion, in one embodiment.

FIG. 2 is a flow diagram that illustrates the processing of the system to analyze related source code files for source code elements relevant to code completion, in one embodiment. Beginning in block 210, the system selects the first file to analyze. The system may process files based on a file or project that a developer is currently editing in a development environment. For example, some development environments provide a project concept that groups related files. A particular file selected by the developer may also reference other files both in and outside of the project. Continuing in block 220, the system performs dynamic analysis on the selected file by executing the file to discover code completion elements defined within the file. This process is described further with reference to FIG. 3. In some cases, dynamic analysis may conclude before the system has fully analyzed the file, such as due to execution exceeding a time-based threshold (e.g., due to an infinite loop or excessive recursion).

Continuing in decision block 230, if dynamic analysis was incomplete, then the system continues at block 240, else the system jumps to block 250. Continuing in block 240, the system performs static analysis on the selected file by compiling the file and identifying code completion elements discovered during compiling. Compiling the file analyzes the file based on the programming language associated with the file and detects defined variables, function names, and other elements that the system presents for completing additional code added by the developer. Static analysis typically finds fewer code completion elements than dynamic analysis, and is used by the system as a fallback position when dynamic analysis fails or cannot complete with the constraints described herein. Continuing in block 250, the system saves the execution and/or compilation state produced during dynamic and static analysis. The saved state provides a cache of the execution context of the analyzed file so that when changes to the file occur (e.g., from developer editing) the system can update the code completion elements without re-analyzing the entire file or set of related files.

Continuing in decision block 260, if the selected file has children or otherwise related files, then the system continues at block 270, else the system completes. Continuing in block 270, the system sets the state of the execution engine based on any modification that the currently selected file produces in the related file or files. For example, the nature of the reference to another file in the selected file may alter how the system analyzes the related file. Alternatively or additionally, the system may reload a previous state of the currently selected file so that analysis can continue from a previous point. Following block 270, the system loops to block 210 to select the next file to analyze. Although not explicitly shown, the system analyzes each related file in this manner. Although these steps are illustrated serially, those of ordinary skill in the art will recognize that various described steps can be performed in parallel and the analysis of each file can be performed in parallel to more fully utilize available processing resources and to reduce the overall execution time. When all files are processed, these steps conclude.

Figure 3:
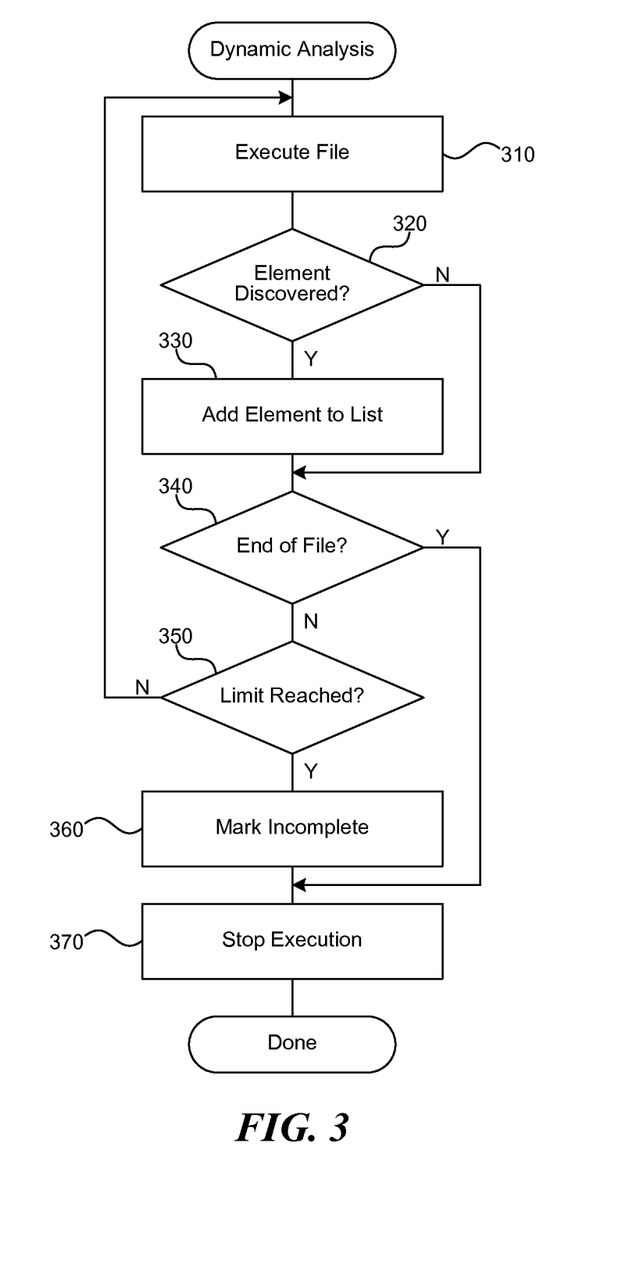
FIG. 3 is a flow diagram that illustrates the processing of the dynamic analysis component to execute and discover code completion elements in a file, in one embodiment.

FIG. 3 is a flow diagram that illustrates the processing of the dynamic analysis component to execute and discover code completion elements in a file, in one embodiment. Beginning in block 310, the component executes a selected file in a modified execution engine. The execution engine performs execution of the file in a development environment that is similar to execution of the file in a production environment. However, the execution environment may include differences relevant to the task of code completion. For example, the execution environment may limit the number of iterations of loops, particularly where additional iterations would not aid in discovery of additional code completion elements and would reduce the time available for executing the remaining code to discover additional elements. In addition, the execution environment may be modified to provide artificial arguments to functions for which the system cannot discover real-world arguments and to provide responses from common objects that are referenced by the selected file but are not present in the development environment (e.g., objects provided by a browser when the file represents scripting code associated with a web page).

Continuing in decision block 320, if the component discovers an element relevant to code completion, then the component continues at block 330, else the component jumps to block 340. Many types of code elements may be relevant to code completion, including variable declarations, type definitions, function declarations, function invocations, references to external variables and other files, and so forth. The system collects these elements and places them in a completion list for use when a developer invokes code completion. Continuing in block 330, the component adds the discovered element to a code completion list for use when the developer invokes code completion. The component may store the list in nonvolatile memory or may cache the list for each file in a state store along with execution context information for the file. In this way, the system can quickly add elements discovered in the file without performing dynamic analysis again until the file has changed.

Continuing in decision block 340, if the component has not reached the end of the file, then the component continues at block 350, else the component jumps to block 370. Continuing in decision block 350, if the component has reached a limit while executing the file, then the component continues at block 360, else the component loops to block 310 to continue executing the file. The system may define several types of limits that place an upper bound on execution time of a particular file. These limits may include time-based limits (e.g., a threshold execution time), loop iteration limits, limits on recursion depth, stack size limits, and so forth.

Continuing in block 360, the component marks the analysis of the file as incomplete so that consumers of the dynamic analysis will know that the analysis potentially did not discover all available code completion elements defined in the file. The component may store information about whether the analysis completed along with other state in the state store described herein. For files for which dynamic analysis does not complete, the system may perform static or other types of analysis. The system may also merge the results of an incomplete dynamic analysis with static or other analysis results to increase the discovered elements available for code completion. Continuing in block 370, the component stops execution of the file based on reaching a limit or reaching the end of the file. After block 370, these steps conclude.

Figure 4:
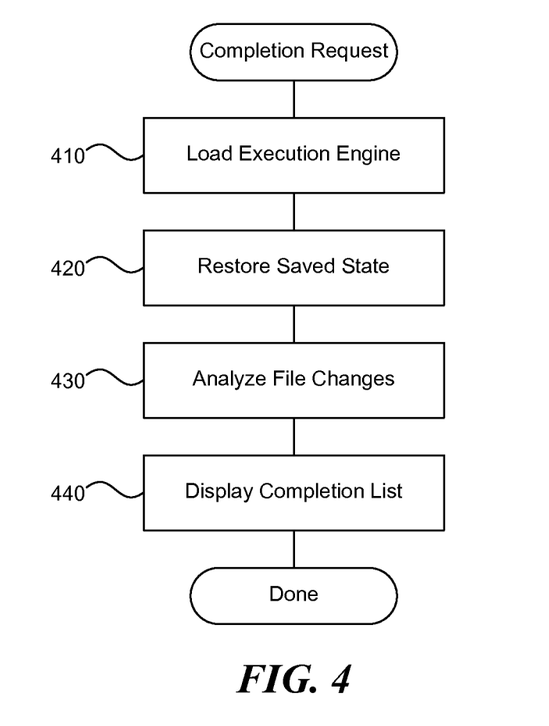
FIG. 4 is a flow diagram that illustrates the processing of the completion request component when the system receives a developer request to complete code, in one embodiment.

FIG. 4 is a flow diagram that illustrates the processing of the completion request component when the system receives a developer request to complete code, in one embodiment. Beginning in block 410, the component loads the execution engine to execute changes to a current file since a last execution of the file. Typically, the system receives completion requests in response to the developer editing the current file. The developer types one or more characters and invokes code completion, such as by pressing a key (e.g., the Tab key) or selecting a menu command. Because code recently added by the developer (or new references added to external code) may contain definitions of variables, functions, and other code elements since the last execution, the system performs a quick dynamic analysis to update the results. Continuing in block 420, the component restores state information stored during the last execution of the file. Restoring the previous information allows the component to reduce the amount of work involved with updating the code completion list and provides a faster response to the developer's code completion request. The restored state may include state information for each referenced file as well as information for the current file up to the first portion of the file changed by the developer's editing.

Continuing in block 430, the component executes the file to the current position and analyzes the file, using any restored state to reduce the amount of execution. For example, if the file references files that were referenced during the last execution, then the component does not re-execute those files, but rather uses the saved state information. In addition, if the current file contains code above the point of editing that has not changed, then the system may reuse previous execution information for that portion of the current file and only re-execute the later portions of the file up to the developer's current position (e.g., based on the cursor or other indicator). Continuing in block 440, the component displays the completion list to the developer updated with any new code completion elements discovered during the execution of the file. The completion list provides a list of potential matches for the code element that the developer would like to reference at the current insertion point. After block 440, these steps conclude.

In some embodiments, the code analysis system limits compilation time of a particular file based on the length of the file or a code element within the file (e.g., a function). For example, the system may give a longer file more time to execute since there is more code in the longer file to execute. In this way, the system can ensure a compilation time that is linear with respect to the length of the file or the length of the code.

In some embodiments, the code analysis system analyzes code skipped due to reaching the time-based threshold or recursion depth using static analysis. For example, a function may contain an infinite loop so that half of the function is not reached by execution of the function. When the time-based threshold is reached, the system will stop execution and analyze the rest of the function using static analysis. Any variables or other declarations found during static analysis will be available for code completion.

In some embodiments, the code analysis system executes functions using a heuristically determined scope when the system cannot dynamically analyze a particular function. For example, the system may synthetically call a function using variable values known to be passed by a caller of the function or known to produce interesting results. In this way, the system can discover any types or other declarations created by executing the function even though the function may not be able to be executed normally. This can be useful when, for example, a developer is editing a function for which the system cannot find a caller to supply likely argument values. The system can spoof the argument values with reasonable guesses (e.g., using a value of false for a Boolean value) so that the function can run enough to provide useful information during dynamic analysis.

In some embodiments, the code analysis system allows the developer to supplement any guesses of the system by providing hints. For example, the system may receive hints from the developer through comments that specify argument types. For languages that are not strongly typed, the system may not even know the type of the argument for a function (e.g., string, integer, and so forth) during dynamic analysis. Developers commonly provide type information to help other developers use the code in comments adhering to a well-known format or in other supplemental information provided with the code. This information can be provided to the system so that the system can at least use variables of the proper type when guessing dynamic values. The following code provides an example of parameter types specified through comments.

```
Function Register(name, age) {
    /// <param name="name" type="String">First and last name.</param>
    /// <param name="age" type="Number">Age of the person.</param>
    var hash = name + age; // "name" is a String, "age" is a "Number"
}
```

In some embodiments, the code analysis system provides substitutes for common objects when executing code for dynamic analysis to produce results that are more complete. For example, JavaScript that is part of a web page may reference browser objects, such as a current window, that are not present since the browser is not present during development of the web page. As another example, a JavaScript file may reference a query object that queries a database when run in production, but that is not available in the development environment. To provide code completion, the system may provide substitute objects that respond in a way similar to the objects references in the code that are not available. This allows the code to execute more like it would once deployed so that the system has more complete code completion results to offer the developer during development.

In some embodiments, the code analysis system provides code elements in namespace scope during code completion. For example, JavaScript code may contain the statement "Type.RegisterNamespace("Foo")" that defines the namespace "Foo" and then one or more variable definitions that are within the created within the namespace. Traditional code completion may not find these variable definitions or may find them but not place them in the proper namespace. The code analysis system allows the developer to type "Foo.x" to locate a variable "x" in the namespace "Foo" as the developer would expect. This is a level of completion not previously available for the file a developer is currently working on, because the current file is traditionally statically analyzed.

In some embodiments, the code analysis system provides error robust compilation and execution. Because files used by the system are often in an intermediate state of creation and editing, where a developer may have added only part of a function, typed code that is syntactically incorrect, and so forth, the system attempts to compile and execute the code in a manner that is lenient enough to continue in the face of such errors. One purpose of code completion is to discover as many defined symbols as possible to offer the developer as the developer is writing new code, so a robust compilation and execution in the face of errors allows the system to find more symbols and thereby provide more value to the developer.

The following are examples of ways that the execution engine can ensure robustness and execution in finite time. Each possible error (e.g., exceptions) may be redefined to evaluate to a non-blocking operation. For example, the engine may convert a statement that results in an exception to a no-op or other benign operation so that the following statements can continue to execute. Flow control statements may be modified to execute in finite time. For example, the engine may restrict loops to a single iteration, restrict execution time of each control flow construct, and/or heuristically ensure monotonic progress is made during executing on the loop controlling variable (e.g., by artificially incrementing the variable). In addition, the engine may provide an artificially small stack space. Function calls (particularly recursive calls) can execute in the available stack space, and if they exceed the stack space may be replaced with a no-op or other benign instruction so that subsequent instructions can continue to execute. Those of ordinary skill in the art will recognize that these and other changes can be made to an execution environment to produce results useful for code completion.

In some embodiments, the code analysis system stores intermediate results for different portions of a file. In most cases where a developer edits a file, the system can produce code completion results by compiling the file below the portion that changed, and using a previously stored compilation state for portions of the file above the portion that changed. By storing snapshots of several portions of a file, the system can start with the most appropriate snapshot for a particular edit (e.g., the snapshot that ends closest to the edit), and then compile the portion below that snapshot to update the code completion results.

From the foregoing, it will be appreciated that specific embodiments of the code analysis system have been described herein for purposes of illustration, but that various modifications may be made without deviating from the spirit and scope of the invention. For example, although source code has been described, various document types that undergo processing can be used with the system, including source code from scripted and compiled languages. In addition, although code completion has been used in examples herein, the system and analysis described can be used for other tasks, such as data mining of source code information, displaying a tree view to a developer of code elements, and so forth. Accordingly, the invention is not limited except as by the appended claims.

We claim:

1. A computer-implemented method for providing code analysis information, the method comprising:
  selecting a file containing software source code to analyze to discover code elements to present in an editing application that provides code completion to a developer;
  performing dynamic analysis on the selected file by executing the software source code within the selected file to discover code elements defined within the selected file;
  determining whether dynamic analysis has reached a time-based limit while executing the selected file that would not provide results in a predictable period that is acceptable for an interactive user interface of the editing application;
  in response to determining that the time-based limit has been reached, performing static analysis on the selected file by compiling the software source code within the file and identifying code completion elements discovered during compiling; and
  saving state information produced during dynamic and static analysis that provides a cache of the execution context of the selected file that can speed up subsequent analysis of the file to provide results in a predictable period that is acceptable for the interactive user interface of the editing application,
  wherein the preceding steps are performed by at least one processor.

2. The method of claim 1 wherein performing dynamic analysis on the selected file comprises providing substitute responses for one or more objects not available during execution of the selected file.

3. The method of claim 1 wherein performing dynamic analysis on the selected file comprises determining arguments and passing the determined arguments to a function defined in the selected file.

4. The method of claim 1 wherein determining whether dynamic analysis has reached the limit while executing the selected file comprises detecting that execution of a code loop has exceeded a threshold number of iterations.

5. The method of claim 1 wherein determining whether dynamic analysis has reached the limit while executing the selected file comprises detecting that execution of the selected file has exceeded a threshold time.

6. The method of claim 5 wherein the threshold time is determined heuristically based on the length of the selected file.

7. The method of claim 1 wherein determining whether dynamic analysis has reached the limit while executing the selected file comprises detecting that execution of the selected file has exceeded a threshold recursion depth.

8. The method of claim 1 wherein determining whether dynamic analysis has reached the limit while executing the selected file comprises detecting that execution of the selected file has exhausted a specified stack size.

9. The method of claim 1 wherein performing static analysis comprises detecting defined variables, function names, and other elements that the system presents for completing additional code added by the developer.

10. The method of claim 1 further comprising modifying a state of execution and analyzing a second file referenced by the selected file, wherein the selected file is part of a project of related files, and wherein at least one file in the project references another file in the project.

11. A computer system for editing source code with text completion, the system comprising:
 a processor and memory configured to execute software instructions embodied within the following components;
 an execution engine configured to execute compiled source code and store an execution context that saves a result of the execution;
 a state store configured to store execution context information stored by the execution engine;
 a dynamic analysis component configured to discover code completion elements by executing source code using the execution engine;
 a static analysis component configured to discover code completion elements that are statically discoverable by compiling source code; and
 a completion request component configured to receive a notification in response to a developer editing a file and invoking code completion, to invoke the dynamic analysis component to perform dynamic analysis until dynamic analysis has reached a time-based limit while executing the file that would not provide results in a predictable period that is acceptable for an interactive user interface of the editing application, and in response to determining that the time-based limit has been reached to invoke the static analysis component to perform static analysis.

12. The system of claim 11 wherein the results stored by the execution engine comprises an intermediate state of the execution engine at a particular point within each file referenced by a particular file and at various points within the particular file.

13. The system of claim 11 wherein the system can provide the stored state for a file to the execution engine to reduce a time to produce the result of executing the file.

14. The system of claim 11 wherein the state store, for each execution context, contains snapshot information provided by the execution engine that is sufficient to reload and invoke the execution engine later to continue execution from the state of the execution engine at a previous point in time.

15. The system of claim 11 wherein the system invokes the static analysis component in response to a failure of the dynamic analysis component to complete analyzing a file.

16. The system of claim 11 wherein the completion request component, in response to the notification, provides a list of one or more code completion elements discovered by dynamic or static analysis of the file.

17. The system of claim 11 wherein the completion request component is further configured, in response to the notification, to re-execute the file using execution context information stored in the state store to reduce the amount of the file executed.

18. A computer-readable storage device excluding carrier signal medium comprising instructions for controlling a computer system to provide code completion during editing of source code, wherein the instructions, when executed, cause a processor to perform actions comprising:
 loading an execution engine to execute changes to a current file since a last execution of the file;
 restoring state information stored during the last execution of the file, wherein the state information places the execution engine in a state of the execution engine in response to the last execution of the file;
 executing the file to a current position by invoking the execution engine and using the restored state information to reduce the amount of execution, and wherein executing the file updates a code completion list that provides one or more code completion elements that a developer can insert into the file; and
 displaying the completion list to the developer updated with at least one code completion element discovered during execution of the file.

19. The device of claim 18 wherein loading the execution engine comprises instructing the execution engine to limit execution based on one or more criteria that reduce execution time.

20. The device of claim 18 wherein the restored state information includes separate state information for each file referenced by the current file and state information for multiple points within the current file.

* * * * *